United States Patent [19]

Hunyar

[11] 4,164,075

[45] Aug. 14, 1979

[54] PHONOGRAPH RECORD ECCENTRICITY TESTER

[75] Inventor: Csaba K. Hunyar, Sunland, Calif.

[73] Assignee: Capitol Records, Inc., Hollywood, Calif.

[21] Appl. No.: 613,637

[22] Filed: Sep. 15, 1975

Related U.S. Application Data

[63] Continuation of Ser. No. 431,568, Jan. 7, 1974, abandoned.

[51] Int. Cl.² ............................................. G01B 7/00
[52] U.S. Cl. .................................. 33/174 Q; 340/686; 274/1 R
[58] Field of Search ........... 33/174 Q, 203.16, 203.19; 274/1 R, 1 B, 1 F; 324/34 GT, 34 ET, 37; 340/282

[56] References Cited

U.S. PATENT DOCUMENTS

| 2,113,226 | 4/1938 | Young | 274/1 F |
| 3,000,005 | 9/1961 | Moyer | 340/282 |
| 3,263,163 | 7/1966 | Foster et al. | 324/34 GT |
| 3,394,303 | 7/1968 | Cressman et al. | 324/37 |
| 3,503,615 | 3/1970 | Matsuda | 274/1 R |

FOREIGN PATENT DOCUMENTS

| 814859 | 8/1937 | France | 274/1 R |

Primary Examiner—Charles E. Phillips
Attorney, Agent, or Firm—William W. Haefliger

[57] ABSTRACT

A phonograph record groove eccentricity tester senses the eccentricity of the circular groove at the inner side of the spiral groove, by means of a groove engaging stylus on a pivoted arm operating a sensor that produces an output signal a peak value of which is displayed.

1 Claim, 2 Drawing Figures

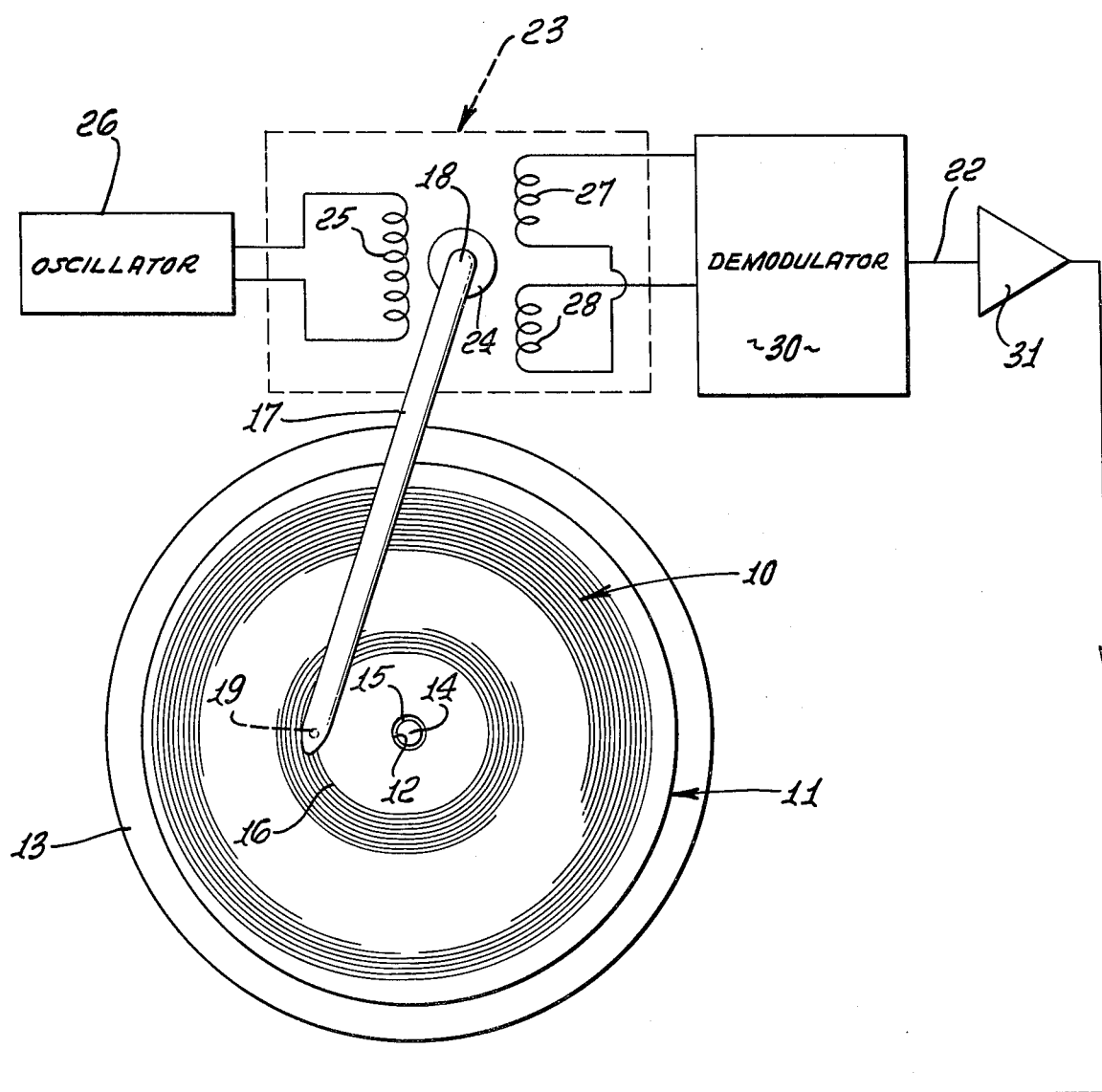
FIG. 1.
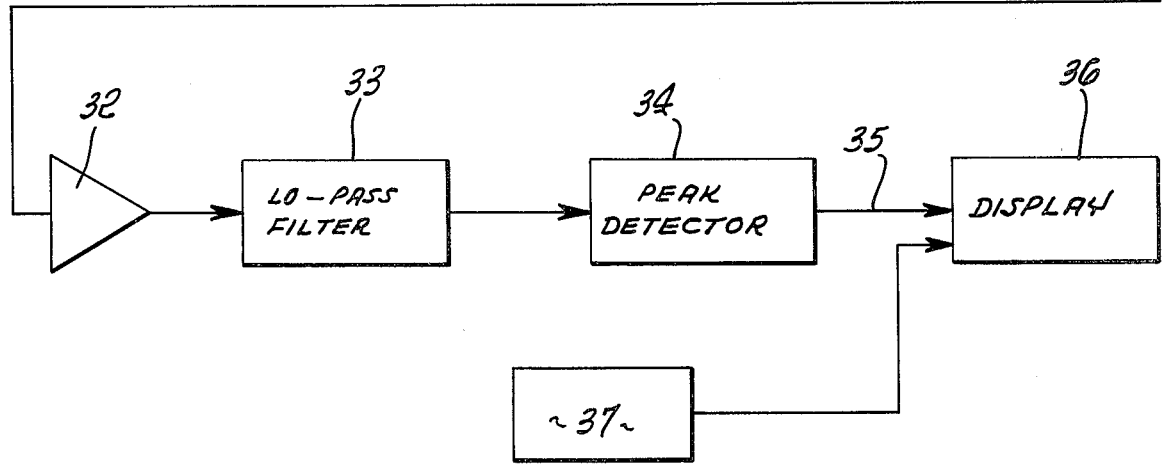

PHONOGRAPH RECORD ECCENTRICITY TESTER

This is a continuation of application Ser. No. 431,568, filed Jan. 7, 1974, now abandoned.

BACKGROUND OF THE INVENTION

This invention relates generally to the production testing of phonograph records, and more particularly concerns simple apparatus to test for record groove eccentricity.

When phonograph records are pressed or molded, the resultant spiral grooving may be slightly eccentrically located relative to the record center pin hole. As a result, when the record is played, the tone arm will pivot slightly back and forth radially (relative to the hole) in addition to moving spirally inwardly, and an audibly detectable WOW can and does result if such back and forth movement exceeds a very slight amount. There is a need for easily usable, simple, rugged apparatus to test for such eccentricity so that production workers using such equipment can quickly and easily determine whether a production record should or should not be rejected. There is no equipment to my knowledge which incorporates the unusual advantages in structure, mode of operation and results as now afforded by the present invention.

SUMMARY OF THE INVENTION

It is a major object of the invention to provide simple, accurate, easily usable equipment of the character described. Basically, such equipment comprises:

(a) an arm having a pivot axis and carrying a stylus the tip of which is adapted to track in a record circular groove in response to rotation of the record on a turntable about a turntable axis in registration with said hole, the arm pivoting about said pivot axis to an extent determined by said eccentricity, (b) sensor means responsive to said arm pivoting to produce an output signal corresponding to the amplitude of said pivoting, and (c) circuit means for processing said signal to produce a read-out corresponding to the peak amplitude thereof.

As will appear, the sensor means may with unusual advantage comprise a rotary variable differential transformer having a rotary core element coupled to the arm to pivot in response to arm pivoting, the advantages of such a transformer including simplicity, high accuracy including linearity, durability and ruggedness, and compactness. In addition, the circuit means referred to may include a digital display, which may be interruptable, for digitally displaying the read-out corresponding to degree of groove eccentricity, as well as other elements to be described.

These and other objects and advantages as well as the details of an illustrative embodiment will be more fully understood from the following description and attached drawings, in which:

FIGS. 1 and 2 are schematics.

DETAILED DESCRIPTION

Figure 2:
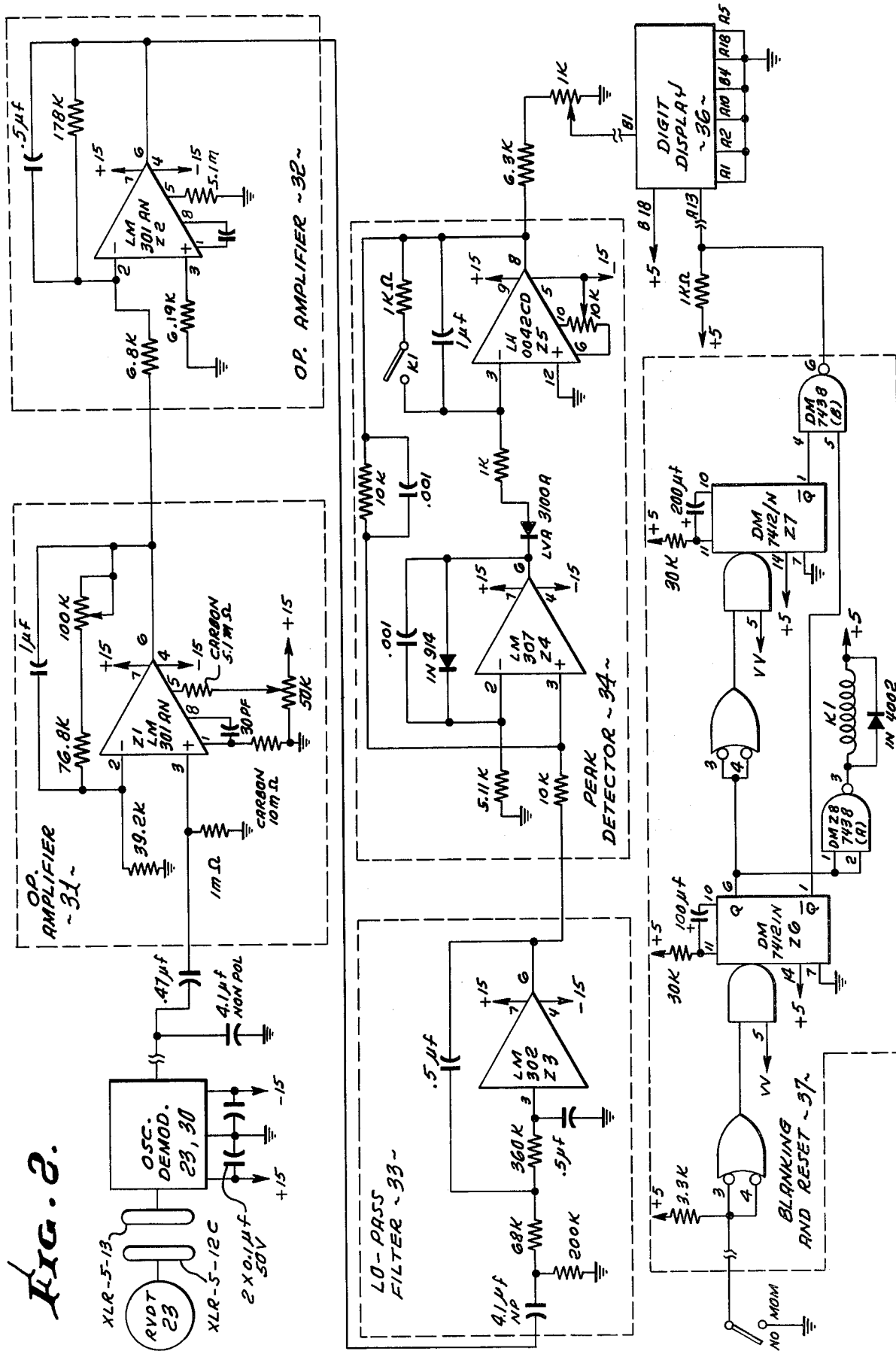

The illustrated device is adapted to measure the eccentricity of spiral grooving, generally indicated at 10 in a phonograph record 11, and relative to the record center pin receiving hole 12. The record is shown as supported on a turntable 13 suitably rotated about axis 14, with the turntable center pin 15 closely received in hole 12.

The record grooving normally includes a circular groove 16 located radially inwardly of the spiral grooving 10 in order to receive the player arm stylus when in use. If the spiral grooving is molded or impressed eccentrically relative to the hole 12 or axis 14, a distortion factor known as output WOW will occur as the tone arm pivots slightly back and forth during playing. In accordance with the invention, and as will be seen, advantage is taken of the fact that any such eccentricity of the spiral grooving will be accompanied by eccentricity of the circular groove 16. More specifically, the latter may extend substantially concentrically, yet eccentrically, about the hole 12 and axis 14, any eccentricity being normally reltively small but being objectionable if it produces detectable WOW.

In accordance with the invention, an arm 17 is provided to have a pivot axis 18 offset from and generally parallel to axis 14. The arm 17 carries a stylus indicated at 19, the tip of which is adapted to track in the circular groove 16 in response to rotation of the record 11 on the turntable about axis 14. The latter of course is in central registration with the hole 12. As a result, the arm pivots back and forth about axis 18 to an extent determined by the eccentricity of the grooving 10 and circular groove 16, relative to hole 12 and axis 14.

Further, sensor means is provided to be responsive to arm pivoting to produce an AC output signal (as for example at 22), corresponding in amplitude to the amplitude of arm pivoting; in addition, circuit means is provided to process the output signal to produce a read-out corresponding to the peak amplitude of the output signal. That read-out, if digital, displays at a glance the extent of groove eccentricity so that a worker can immediately reject the record if the eccentricity value exceeds a pre-determined value representing the transition from non-objectionable to objectionable WOW.

More specifically, the sensor means may comprise the illustrated rotary variable differential transformer 23 having a rotary core element 24 attached to the arm 17 to pivot about axis 18 in response to arm pivoting as described. The transformer also includes a primary or center coil 25 receiving excitations at a relatively high carrier frequency (as related to the WOW frequency) from oscillator 26. Voltage is thereby induced in two outer or secondary coils 27 and 28 connected in series opposition, so that the two voltages in the secondary circuit are opposite in phase, the net output of the transformer being the difference of these voltages. Accordingly, rotary motion of the core produces a linear voltage output. As seen in the drawings, coils 25, 27 and 28 are not rotatable and hence have fixed positions.

The transformer output is then demodulated at 30, as by rectification and filtering, to produce a relatively slowly alternating voltage at 22 which is a direct measure of the degree of pivoting of arm 17. After DC amplification at 31 and 32, the signal is filtered at 33 to remove any unwanted high frequency components (for example above one Hz) after which detector 34 detects high and low signal peaks and subtracts same to produce a difference voltage at 35 for display at 36. If the displayed value (corresponding to grooving eccentricity as described) exceeds the predetermined value as referred to, the record is rejected. Display 36 may consist of a digital panel meter to provide a suitably digital display. Circuitry 37 may be provided to interrupt the input to the display at short intervals (as for example by operating a reset switch in the display, or by operating a known sample and hold circuit) to enable reading during the interrupt time of a digital value which does not flicker or vary.

The rotary variable differential transformer is a known instrument, one example being Schaevitz Model R30A, a product of Schaevitz Engineering, Pennsauken, N.J. Elements 26, 30 and 31 are also known, and may be obtained from Schaevitz Engineering. Finally, elements 32, 33, 34, 36 and 37 are known and/or may be provided by those skilled in the art made familiar with this description.

FIG. 2 shows one form of circuitry, including elements 31, 32, 33, 34, 36 and 37, others being possible.

I claim:

1. In combination, a turntable having a center pin, a phonograph record carried by the turntable with the pin received in the record center pin hole, and a device for measuring the eccentricity of grooving in said phonograph record relative to the record center pin hole, said grooving including spiral grooving and a circular groove extending substantially concentrically but eccentrically about said hole and radially inwardly of said spiral grooving, said device comprising (a) a single arm having a pivot axis and carrying a stylus the tip of which is spaced from said axis and at all times confined only in said circular groove for tracking therein in response to rotation of the record on the turntable about a turntable axis in registration with said hole, the arm pivoting about said pivot axis to an extent determined by said eccentricity, (b) sensor means responsive to pivoting of said single arm to produce an AC output signal having an amplitude corresponding to the amplitude of said pivoting, and (c) circuit means including a digital display for processing said signal to produce a digital read-out corresponding to the peak amplitude of said signal, (d) said sensor means comprising a rotary variable differential transformer having a rotary core element coupled to said arm to pivot in response to said arm pivoting, said transformer having a primary coil receiving excitation at a carrier frequency and two secondary coils connected in series opposition so that the voltages induced therein are opposite in phase and said output signal represents the difference between said voltage induced in said secondary coils, said primary and secondary coils having fixed, non-rotating position so that only the core of said sensor means is rotatable, (e) said circuit means including a demodulator, amplifier, low-pass filter and high and low peak detector means electrically coupled in series relation between the output of said transformer and the input of said display, the detector means detecting high and low AC signal peaks and subtracting same to produce a difference voltage for display, and (f) there being means connected with the display to hold the display output at an input value for a selected time interval.

* * * * *